United States Patent
Zhang et al.

(10) Patent No.: US 8,091,674 B1
(45) Date of Patent: Jan. 10, 2012

(54) TORQUE DETECTING SYSTEM FOR BOTTOM BRACKET AXLE OF POWER-ASSISTED BICYCLE AND TWO-PHASE SIGNAL TRANSMITTING METHOD USING THE SAME

(75) Inventors: Bin Zhang, Guangdong Province (CN); Yuan-Fang Hsu, Hsinchu (TW)

(73) Assignee: J. D. Components Co., Ltd. (TW)

( * ) Notice: Subject to any disclaimer, the term of this patent is extended or adjusted under 35 U.S.C. 154(b) by 0 days.

(21) Appl. No.: 12/969,972

(22) Filed: Dec. 16, 2010

(51) Int. Cl.
   *B60K 1/00* (2006.01)
   *B62D 61/02* (2006.01)
   *B62M 6/00* (2010.01)

(52) U.S. Cl. .................... 180/220; 180/65.1; 180/205.1; 180/206.1

(58) Field of Classification Search .................. 180/65.1, 180/205.1, 206.1, 206.2, 206.3, 206.4, 206.5, 180/206.6, 206.7, 206.8, 220
See application file for complete search history.

(56) References Cited

U.S. PATENT DOCUMENTS

| | | | | |
|---|---|---|---|---|
| 5,027,303 | A * | 6/1991 | Witte | 702/44 |
| 6,011,366 | A * | 1/2000 | Murakami et al. | 318/1 |
| 6,173,801 | B1 * | 1/2001 | Kakutani et al. | 180/220 |
| 6,263,992 | B1 * | 7/2001 | Li | 180/206.3 |
| 6,418,797 | B1 * | 7/2002 | Ambrosina et al. | 73/862.29 |
| 7,806,006 | B2 * | 10/2010 | Phillips et al. | 73/862.338 |

* cited by examiner

*Primary Examiner* — Tony H. Winner
*Assistant Examiner* — Marc Scharich
(74) *Attorney, Agent, or Firm* — Browdy and Neimark, PLLC

(57) ABSTRACT

A torque detecting system for a bottom bracket axle of a power-assisted bicycle includes a torque sensor for being mounted on the bottom bracket axle of the bicycle, a wireless signal transmitter arranged stationarily relative to the bottom bracket axle, and a wireless signal receiver for being arranged at a location of a bicycle frame of the bicycle in proximity to the bottom bracket axle. The wireless signal transmitter is adapted for receiving a detected signal, which is outputted from the torque sensor, and then transmitting the detected signal to the wireless signal receiver wirelessly. In this way, the signal attenuation and the possibility of signal loss of the detected signal can be minimized during the signal transmission, such that the torque applied on the bottom bracket axle by the bicyclist can be detected precisely.

16 Claims, 3 Drawing Sheets

TORQUE DETECTING SYSTEM FOR BOTTOM BRACKET AXLE OF POWER-ASSISTED BICYCLE AND TWO-PHASE SIGNAL TRANSMITTING METHOD USING THE SAME

BACKGROUND OF THE INVENTION

1. Field of the Invention

The present invention relates generally to a torque detecting system for a bicycle, and more specifically to a torque detecting system for a bottom bracket axle of a power-assisted bicycle and a two-phase signal transmitting method using the aforesaid torque detecting system.

2. Description of the Related Art

A conventional electrical power-assisted bicycle is equipped with an electrical motor adapted either to power the bicycle or to assist with pedaling. Usually, the power-assisted bicycle has a built-in torque detecting system including a strain gauge for detecting a torque applied on the bicycle, and a controller for determining whether or not the power applied on the pedal by the bicyclist is sufficient based on the detected torque. In a conventional design, the strain gauge is attached on a bicycle frame of the power-assisted bicycle in order to transmit the detected signal to the controller precisely. This design has however a drawback that the power applied on the bicycle by the bicyclist to the bicycle can not be measured precisely by reference to the torque received by the bicycle frame. In another conventional design, the strain gauge is attached on a bottom bracket axle connected with a crank that is driven by a pedal and the detected signal of the strain gauge is transmitted to the controller through a transducer mounted on the bicycle frame, such that the power applied on the bicycle by the bicyclist can be more precisely measured by reference to the detected signal of the strain gauge. However, this design has problems of signal attenuation and signal loss in the process of signal transmission because the strain gauge will move along with the rotary bottom bracket axle and the transducer is kept away from the strain gauge a certain distance, resulting in controller's miscalculation about the power applied by the bicyclist. In other words, it is desirable to provide a torque detecting system for a power-assisted bicycle, which can eliminate the aforesaid drawbacks.

SUMMARY OF THE INVENTION

It is one object of the present invention to provide a torque detecting system for a bottom bracket axle of a power-assisted bicycle and a two-phase signal transmitting method using the system, which can precisely detect the torque applied on the bottom bracket axle by the bicyclist.

To achieve the above-mentioned object of the present invention, the torque detecting system provided by the present invention comprises a torque sensor, which is adapted for being mounted on a bottom bracket axle of a power-assisted bicycle, a wireless signal transmitter, which is arranged stationarily relative to the bottom bracket axle and electrically connected with the torque sensor for receiving a detected signal outputted from the torque sensor and then transmitting the detected signal wirelessly, and a wireless signal receiver, which is adapted for being arranged at a location of a bicycle frame of the power-assisted bicycle in proximity to the bottom bracket axle for receiving the detected signal transmitted from the wireless signal transmitter and then outputting the detected signal. In this way, the detected signal outputted from the torque sensor can be sent to a controller through the wireless signal transmitter and the wireless signal receiver in succession, such that the signal attenuation and the possibility of signal loss of the detected signal can be minimized during the process of signal transmission. As a result, the torque applied on the bottom bracket axle by the bicyclist can be detected precisely by the torque detecting system of the present invention and served as a reference for the controller's determination.

One aspect of the present invention is to provide a two-phase signal transmitting method using the above-mentioned torque detecting system. The method comprises the steps of a) wirelessly transmitting the detected signal outputted from the torque sensor to the wireless signal receiver that is stationary by the wireless signal transmitter that is moveable, and b) wiredly or wirelessly transmitting the detected signal to a controller that is stationary by the wireless signal receiver.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
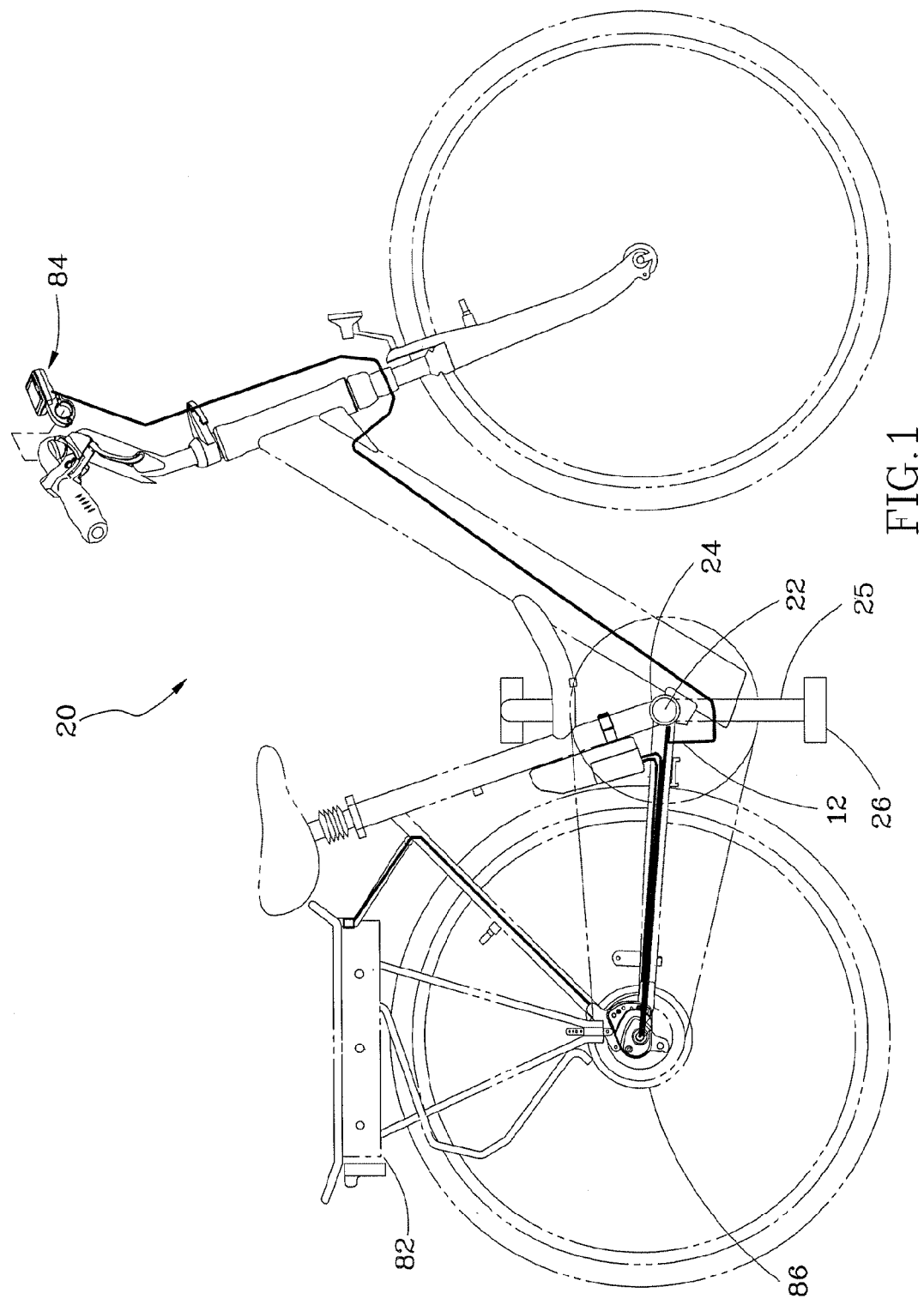
FIG. 1 is a schematic drawing showing that a torque detecting system according to a preferred embodiment of the present invention is installed in a power-assisted bicycle.
Figure 2:
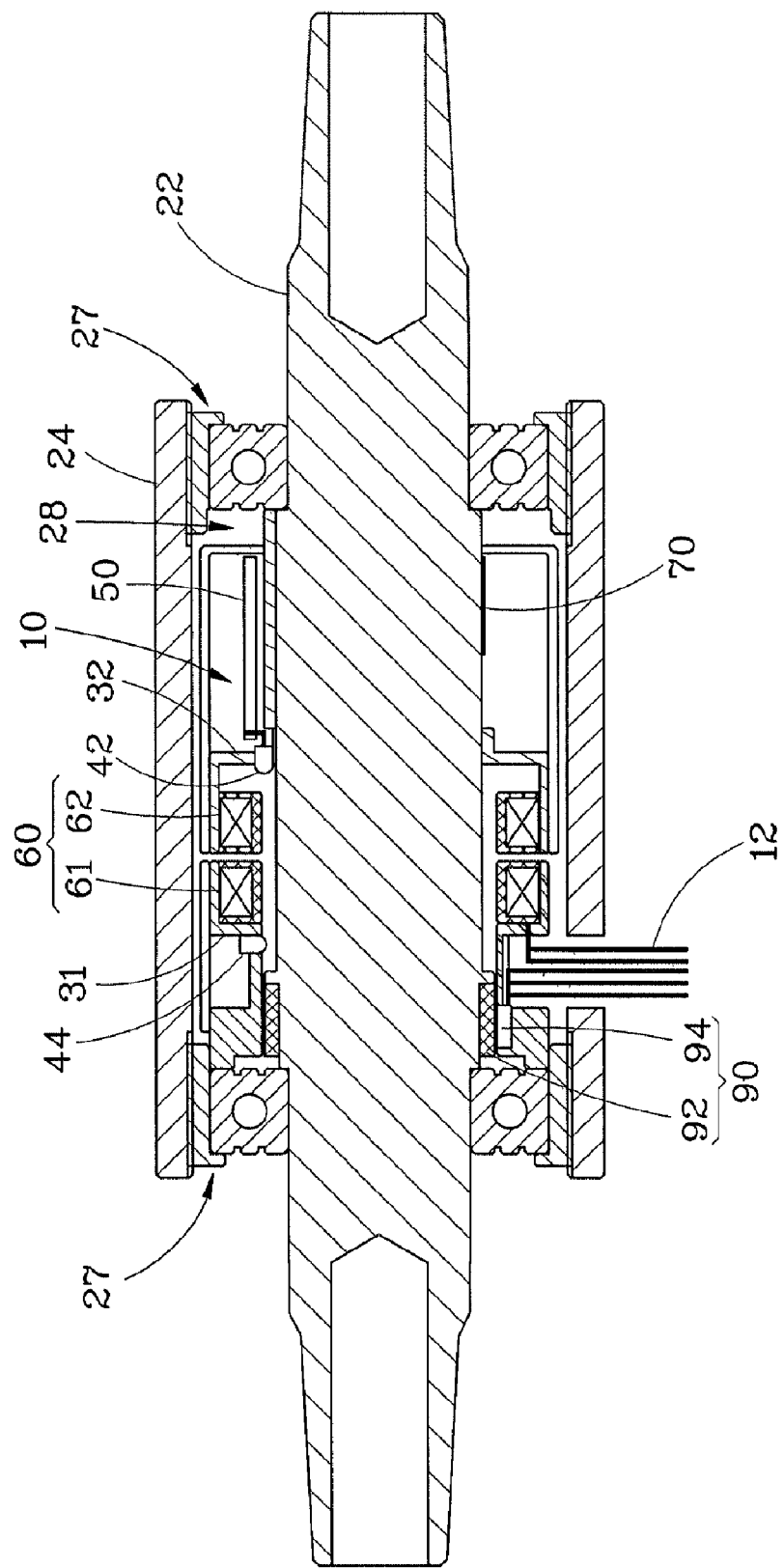
FIG. 2 is a schematic sectional view showing that the torque detecting system of the preferred embodiment of the present invention is installed in a bottom bracket shell and a bottom bracket axle.

As shown in FIGS. 1-2, the torque detecting system, denoted by reference numeral 10, is adapted for being installed with a bottom bracket axle 22 and a bottom bracket shell 24 of a power-assisted bicycle 20. The torque detecting system 10 comprises a first bracket 31, a second bracket 32, a wireless signal transmitter 42, a wireless signal receiver 44, an application-specific circuit 50, a transformer 60, and a torque sensor 70. The features and mechanical and/or electrical relationships of the aforesaid elements of the system 10 will be detailedly depicted as follows.

The bottom bracket axle 22 is rotatably inserted through the bottom bracket shell 24 which is a stationary part of a bicycle frame of the power-assisted bicycle 20. The bottom bracket axle 22 has two ends, each of which is connected with a crank 25 that is in turn connected with a pedal 26 that is to be trodden by a bicyclist of the power-assisted bicycle 20, such that the torque generated from bicyclist's treading force applying on the pedals 26 by the length of the cranks 25 will drive the bottom bracket axle 22 to rotate. In addition, as shown in FIG. 2, the bottom bracket axle 22 is supported by two bearings 27, which are mounted inside the bottom bracket shell 24, such that the bottom bracket axle 22 is rotatable relative to the bottom bracket shell 24 but can not move axially. A receiving space 28 is defined between the two bearings 27 and between the outer periphery of the bottom bracket axle 22 and the inner periphery of the bottom bracket shell 24 for accommodating the torque detecting system 10 therein.

The first bracket 31 is fixedly mounted to the bottom bracket shell 24, which is a part of the bicycle frame of the power-assisted bicycle 20, such that the first bracket 31 is stationary relative to the bicycle frame. The second bracket 32 is fixedly mounted onto the bottom bracket axle 22, such that the second bracket 32 is moveable along with the bottom bracket axle 22 along a circular path. The wireless signal receiver 44 is fixedly mounted to the first bracket 31, and the wireless signal transmitter 42 is fixedly mounted to the second bracket 32 and able to transmit signal to the wireless signal receiver 44 by infrared rays or electromagnetic waves so as to realize the function of wireless signal transmission.

Figure 3:
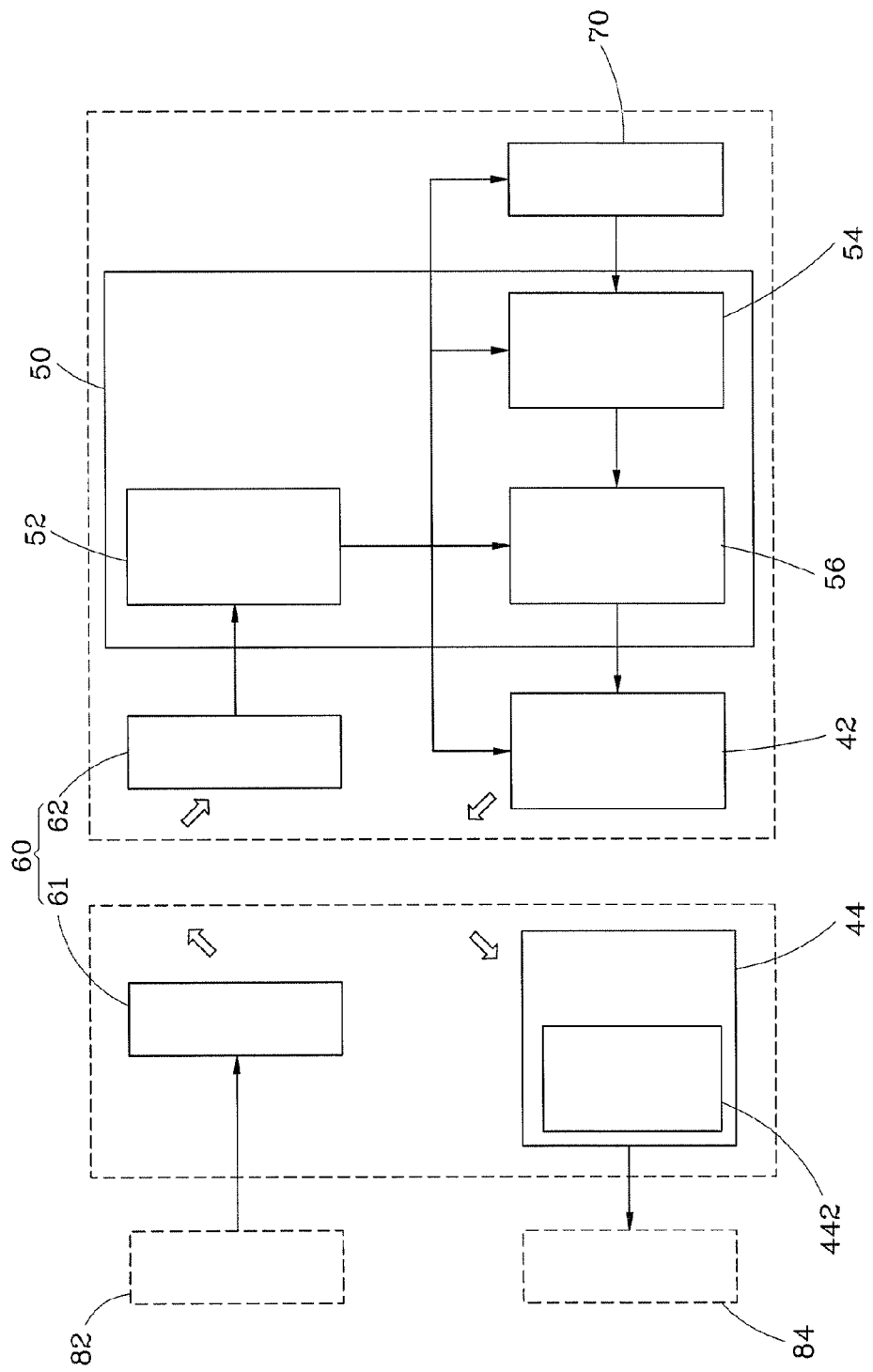
FIG. 3 is a simplified block diagram of the torque detecting system of the preferred embodiment of the present invention.

The application-specific circuit 50 is fixedly mounted on the second bracket 32, such that the circuit 50 is stationary relative to the bottom bracket axle 22. As shown in FIG. 3, the application-specific circuit 50 comprises a rectifying and voltage-stabilizing unit 52, a signal amplifying unit 54 and a signal modulating unit 56, which are electrically connected thereamong. The rectifying and voltage-stabilizing unit 52 is electrically connected with the wireless signal transmitter 42, the transformer 60 and the torque sensor 70. The signal modulating unit 56 is electrically connected with the wireless signal transmitter 42 and adapted to modulate the received signal into a digital form that is suitable for wireless transmission and then to transmit the modulated signal to the wireless signal transmitter 42.

The transformer 60 comprises a first conductor 61 fixedly mounted on the first bracket 31, and a second conductor 62 fixedly mounted on the second bracket 32. The first conductor 61 is a primary coil formed by an enameled wire having a number of turns, and is electrically connected with a power supply 82 through a cable 12. The second conductor 62 is a secondary coil formed by an enameled wire having a number of turns, and is electrically connected with the rectifying and voltage-stabilizing unit 52 of the application-specific circuit 50. The first conductor 61 is spaced from the second conductor 62 at a distance. When the second conductor 62 is moved along with the bottom bracket axle 22 along a circular path relative to the first conductor 61, the alternate current supplied by the power supply 82 to the first conductor 61 will be inductively coupled to the second conductor 62, such that an induced alternate current will be generated in the second conductor 62 and then conveyed to the signal amplifying unit 54, the signal modulating unit 56, the wireless signal transmitter 42 and the torque sensor 70 through the rectifying and voltage-stabilizing unit 52 after the induced alternated current is processed by the rectifying and voltage-stabilizing unit 52 to have a stable voltage.

For the torque sensor 70, a conventional resistive type strain gauge can be used. The torque sensor 70 is attached on the bottom bracket axle 22 for detecting a micro deformation of the axle 22 due to the torque applied on the axle 22 by a bicyclist and outputting a corresponding detected signal to the application-specific circuit 50. The detected signal outputted from the torque sensor 70 will be amplified by the signal amplifying unit 54, modulated into digital form by the signal modulating unit 56, and then transmitted to the wireless signal receiver 44 through the wireless signal transmitter 42. After the wireless signal receiver 44 receives the signal, a signal demodulating unit 442 of the wireless signal receiver 44 will demodulate the signal into an analog form and then the demodulated signal will be sent to a controller 84 through the cable 12. Alternatively, the wireless signal receiver 44 can transmit the detected signal to the controller 84 wirelessly through infrared rays or electromagnetic waves.

By means of the torque detecting system 10 provided by the present invention, the controller 84 can receive the detected signal sent by the torque sensor 70 so as to learn the torque applied on the bottom bracket axle 22 and then to control, on the basis of the detected signal, an output power of a motor 86 for aiding power to the bicycle 20. Since the detected signal of the torque sensor 70 is sent to the wireless signal transmitter 42 that is stationarily arranged relative to the torque sensor 70 and the wireless signal receiver 44 is spaced at a small distance from the wireless signal transmitter 42, the signal attenuation and the possibility of signal loss of the detected signal can be minimized in the signal transmitting process though the wireless signal transmitter 42 is moveable along a circular path relative to the wireless signal receiver 44. As a result, the torque applied on the bottom bracket axle 22 by the bicyclist can be measured precisely.

On the other hand, as shown in FIG. 2, the torque detecting system 10 of the present invention can further comprise a revolution sensor 90 including a magnetic ring 92 fixedly sleeved onto the bottom bracket axle 22, and an electronic sensing element 94, which is realized by a Hall integrated circuit in this embodiment. The electronic sensing element 94 is fixedly mounted on the first bracket 31 and able to read the revolving signal of the magnetic ring 92 and then send the revolving signal to the controller 84 through the cable 12 for enabling the controller 84 to acquire the revolution of the bottom bracket axle 22.

In the above-mentioned embodiment, the first bracket 31 is used for supporting the first conductor 61 of the transformer 60 and the wireless signal receiver 44 in such a way that the first conductor 61 and the wireless signal receiver 44 are close to the bottom bracket axle 22 and prohibited to move along with the bottom bracket axle 22. However, the first bracket 31 can be eliminated if the first conductor 61 and the wireless signal receiver 44 are directly mounted to the bottom bracket shell 24, the crank 25 or a location of the bicycle frame of the bicycle 20 in proximity to the bottom bracket axle 22. On the other hand, the second bracket 32 can also be eliminated if the wireless signal transmitter 42 and the second conductor 62 of the transformer 60 are directly mounted on the bottom bracket axle 22.

From the above-mentioned description, it will be clearly understood that a feature of the present invention lies in that the signal is transmitted in two phases from the wireless signal transmitter 42 to the controller 84. Specifically speaking, the present invention provides a two-phase signal transmitting method comprising the steps of using the wireless signal transmitter 42 that is moveable relative to the bottom bracket shell 24 to wirelessly transmit the detected signal sent from the torque sensor 70 to the wireless signal receiver 44 that is stationary, and using the wireless signal receiver 44 to transmit the detected signal to the controller 84 that is stationary wiredly or wirelessly. In addition, the distance between the wireless signal transmitter 42 and the wireless signal receiver 44 is smaller than the distance between the wireless signal receiver 44 and the controller 84 such that the signal attenuation and the possibility of signal loss of the detected signal can be minimized in the signal transmitting process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A torque detecting system for a bottom bracket axle of a power-assisted bicycle, the torque detecting system comprising:
   a torque sensor mounted on the bottom bracket axle of the power-assisted bicycle;
   a wireless signal transmitter arranged stationarily relative to the bottom bracket axle and electrically connected with the torque sensor for receiving a detected signal outputted from the torque sensor and transmitting the detected signal wirelessly, and
   a wireless signal receiver arranged at a location of a bicycle frame of the power-assisted bicycle in proximity to the bottom bracket axle for receiving the detected signal transmitted from the wireless signal transmitter and then outputting the detected signal.

2. The torque detecting system as claimed in claim 1, furthering comprising a transformer including a first conductor arranged stationarily relative to a bottom bracket shell of the power-assisted bicycle and electrically connected with a power supply, and a second conductor arranged stationarily relative to the bottom bracket axle such that the second conductor is moveable along with the bottom bracket axle relative to the first conductor for conveying an electrical power from the power supply through the first conductor to the torque sensor and the wireless signal transmitter.

3. The torque detecting system as claimed in claim 2, further comprising an application-specific circuit, which is arranged stationarily relative to the bottom bracket axle and electrically connected with the second conductor of the transformer, the torque sensor and the wireless signal transmitter; wherein the application-specific circuit comprises a rectifying and voltage-stabilizing unit, a signal amplifying unit and a signal modulating unit.

4. The torque detecting system as claimed in claim 3, wherein the wireless signal receiver comprises a signal demodulating unit.

5. The torque detecting system as claimed in claim 2, wherein the first conductor of the transformer is electrically connected with the power supply through a cable for receiving an alternate current from the power supply.

6. The torque detecting system as claimed in claim 2, further comprising a first bracket for being fixedly mounted in the bottom bracket shell through which the bottom bracket axle is rotatably inserted; wherein the wireless signal receiver and the first conductor of the transformer are fixedly mounted to the first bracket.

7. The torque detecting system as claimed in claim 6, further comprising a revolution sensor, which includes a magnetic ring for being fixedly mounted to the bottom bracket axle, and an electronic sensing element mounted to the first bracket.

8. The torque detecting system as claimed in claim 6, further comprising a second bracket for being fixedly mounted to the bottom bracket axle; wherein the wireless signal transmitter and the second conductor of the transformer are fixedly mounted to the second bracket.

9. The torque detecting system as claimed in claim 1, wherein the wireless signal receiver is arranged on a bottom bracket shell through which the bottom bracket axle is inserted, a crank connected between the bottom bracket axle and a pedal, or a stationary location of the bicycle frame in proximity to the bottom bracket axle.

10. The torque detecting system as claimed in claim 1, wherein the wireless signal transmitter transmits the detected signal wirelessly through electromagnetic waves or infrared rays.

11. The torque detecting system as claimed in claim 1, wherein the wireless signal receiver transmits the detected signal to a controller wiredly or wirelessly.

12. The torque detecting system as claimed in claim 11, wherein the controller controls an output power of a motor based on the detected signal.

13. A two-phase signal transmitting method using the torque detecting system of claim 1, comprising the steps of:
   a) wirelessly transmitting the detected signal outputted from the torque sensor to the wireless signal receiver that is stationary by the wireless signal transmitter that is moveable, and
   b) wiredly transmitting the detected signal to a controller that is stationary by the wireless signal receiver.

14. The two-phase signal transmitting method of claim 13, wherein a distance between the wireless signal transmitter and the wireless signal receiver is smaller than a distance between the wireless signal receiver and the controller.

15. A two-phase signal transmitting method using the torque detecting system of claim 1, comprising the steps of:
   a) wirelessly transmitting the detected signal outputted from the torque sensor to the wireless signal receiver that is stationary by the wireless signal transmitter that is moveable, and
   b) wirelessly transmitting the detected signal to a controller that is stationary by the wireless signal receiver.

16. The two-phase signal transmitting method of claim 15, wherein a distance between the wireless signal transmitter and the wireless signal receiver is smaller than a distance between the wireless signal receiver and the controller.

\* \* \* \* \*